US012383771B2

(12) United States Patent
Allan et al.

(10) Patent No.: US 12,383,771 B2
(45) Date of Patent: *Aug. 12, 2025

(54) ADJUSTABLE SUPPORT FRAME FOR A BREATHING APPARATUS

(71) Applicant: DRAEGER SAFETY UK LIMITED, Blyth (GB)

(72) Inventors: Jason Edward Allan, North Shields (GB); Darin Ferguson, Ashington (GB)

(73) Assignee: DRAEGER SAFETY UK LIMITED, Blyth (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/636,699

(22) Filed: Apr. 16, 2024

(65) Prior Publication Data

US 2024/0252849 A1 Aug. 1, 2024

Related U.S. Application Data

(63) Continuation of application No. 17/179,685, filed on Feb. 19, 2021, now Pat. No. 11,986,685.

(30) Foreign Application Priority Data

Mar. 24, 2020 (EP) .................................... 20165380

(51) Int. Cl.
*A62B 9/04* (2006.01)

(52) U.S. Cl.
CPC ..................................... *A62B 9/04* (2013.01)

(58) Field of Classification Search
CPC ......... A62B 25/00; A62B 25/005; A62B 9/04; A45F 3/08; A45F 3/10; A45F 3/14
See application file for complete search history.

(56) References Cited

U.S. PATENT DOCUMENTS

| | | | |
|---|---|---|---|
| 7,198,186 | B2 | 4/2007 | Kling et al. |
| 2003/0140392 | A1 | 7/2003 | Kling et al. |
| 2003/0192925 | A1 | 10/2003 | Boone |

(Continued)

FOREIGN PATENT DOCUMENTS

| | | | |
|---|---|---|---|
| CN | 202802556 U | 3/2013 | |
| CN | 206852939 U | 1/2018 | |
| FR | 2886621 A1 | 12/2006 | |

(Continued)

*Primary Examiner* — Corey N Skurdal
(74) *Attorney, Agent, or Firm* — Banner & Witcoff, Ltd.

(57) ABSTRACT

Disclosed is an adjustable support frame for a breathing apparatus having an adjustable longitudinal dimension and a user-facing side configured to substantially overlay a user's back in use, the adjustable support frame comprising: a first frame portion and a second frame portion, the first and second frame portions being moveable relative to each other so as to adjust the longitudinal dimension; an adjustment mechanism having a locked configuration which inhibits relative movement of the first and second frame portions and an unlocked configuration which permits relative movement of the first and second frame portions; wherein the adjustment mechanism comprises one or more actuating elements which are operable to actuate the adjustment mechanism from the locked configuration to the unlocked configuration, the one or more actuating elements being provided on a surface which is substantially perpendicular to the user-facing side of the support frame.

14 Claims, 10 Drawing Sheets

(56) References Cited

U.S. PATENT DOCUMENTS

| | | | |
|---|---|---|---|
| 2004/0045991 | A1 | 3/2004 | Kling et al. |
| 2018/0117372 | A1 | 5/2018 | Mesman |

FOREIGN PATENT DOCUMENTS

| | | | |
|---|---|---|---|
| GB | 2572971 | A | 10/2019 |
| WO | 0197916 | A1 | 12/2001 |
| WO | 0197917 | A1 | 12/2001 |
| WO | 2014140519 | A1 | 9/2014 |

ADJUSTABLE SUPPORT FRAME FOR A BREATHING APPARATUS

CROSS-REFERENCE TO RELATED APPLICATIONS

This application is a continuation of U.S. application Ser. No. 17/179,685, filed on Feb. 19, 2021, which claims priority to European Application No. 20165380.5, filed Mar. 24, 2020, the entire contents of which being fully incorporated herein by reference.

The present disclosure relates to an adjustable support frame for a breathing apparatus and is particularly, although not exclusively, concerned with a length-adjustable back plate for a breathing apparatus, such as a self-contained breathing apparatus (SCBA).

BACKGROUND

Breathing apparatuses, such as SCBAs, comprise support frames, which may also be known as back plates. These support frames may be adjustable so as to be configured to suit the size of the user using the breathing apparatus.

In prior art systems, adjustment mechanisms for adjusting the dimensions of the support frame are generally configured to make it difficult for the frame to be adjusted in use, to avoid accidental adjustments.

However it will be appreciated that improvements in adjustable support frames for breathing apparatus may be desirable.

SUMMARY OF INVENTION

According to a first aspect of the present disclosure, there is provided an adjustable support frame for a breathing apparatus having an adjustable longitudinal dimension and a user-facing side configured to substantially overlay a user's back in use, the adjustable support frame comprising: a first frame portion and a second frame portion, the first and second frame portions being moveable relative to each other so as to adjust the longitudinal dimension; an adjustment mechanism having a locked configuration which inhibits relative movement of the first and second frame portions and an unlocked configuration which permits relative movement of the first and second frame portions; wherein the adjustment mechanism comprises one or more actuating elements which are operable to actuate the adjustment mechanism from the locked configuration to the unlocked configuration, the one or more actuating elements being provided on a surface which is substantially perpendicular to the user-facing side of the support frame, wherein the adjustable support frame comprises at least one frame rail which extends in a substantially longitudinal direction and a bridge portion extending in a lateral direction substantially perpendicular to the at least one frame rail, and wherein the one or more actuating elements are provided on a longitudinally-facing surface of the bridge portion.

The support frame may be a back plate for a breathing apparatus.

The adjustment mechanism may be biased into the locked configuration.

The surface on which the actuating element or elements are provided may be referred to as an accessible surface.

The term "longitudinal" may be understood as a direction which is substantially vertical in use of the support frame. The longitudinal direction may be parallel with the direction of extent of the user's spine or body when standing. The term "lateral" may be understood as a direction which is substantially horizontal in use of the support frame and which generally extends sideways relative to (i.e. across) the user. The lateral direction may generally be parallel to the direction of a line extending between the user's shoulders and/or hips.

The adjustable support frame may further comprise first and second laterally-spaced frame rails. The bridge portion may extend laterally between the frame rails.

The one or more actuating elements being provided on a longitudinally-facing surface of the bridge portion may mean the surface on which the actuating elements are provided is a longitudinally-facing surface of the bridge portion.

The adjustable support frame may have the user-facing side and an outer-facing side opposing the user facing side. The support frame may further comprise a relief formed in the user-facing side of the support frame, or an aperture through the support frame between the user-facing side and the outer-facing side. The one or more actuating elements may be arranged on a peripheral wall of the relief or aperture (i.e. the surface on which the actuating elements are provided may be a peripheral wall of the relief or aperture).

The support frame may comprise two frame rails (first and second frame rails) which define the relief or aperture therebetween. The frame rails may comprise at least a portion of the peripheral wall of the relief or aperture.

The "peripheral wall" should be understood to be a wall surrounding the relief or aperture which is substantially perpendicular to the user-facing surface of the support frame. The or a bridge portion may define at least a portion of the peripheral wall.

The wall may be comprised of a plurality or distinct wall portions or surfaces, which may be provided on different parts of the support frame. For example, the support frame could comprise two frame rails and two bridge portions, and the relief or aperture could form a substantially rectangular shape which is bordered on each side by one of the frame rails or bridge portions, which together define the peripheral wall.

The one or more actuating elements may extend into the relief or aperture from a peripheral wall. In other words, the actuating element or elements may be features which project out or stand proud from the peripheral wall to extend into the relief or aperture.

The one or more actuating elements may comprise an elongate grippable portion which extends in a direction substantially parallel to the user-facing side of the support frame. Optionally, the elongate grippable portion may extend substantially longitudinally or laterally relative to the support frame.

The actuating mechanism may comprise first and second actuating elements which, when urged together by a user, actuate the adjustment mechanism into the unlocked position.

The first and/or second frame elements may be configured such that the one or more actuating elements maintain a substantially static longitudinal position relative to a part of a user's back.

The first frame portion may be an upper frame portion, and the second frame portion may be a lower frame portion. The upper frame portion may comprise fixing points for an upper end of one or more shoulder straps for supporting the support frame on a user's shoulders. The lower frame portion may comprise a securement apparatus, optionally a waist belt, for securing the lower frame portion at a user's waist or lower torso. The one or more actuating elements are provided: i) on the lower frame portion, such that the one or more actuating elements maintain a substantially static position relative to the user's waist; or ii) on the upper frame portion, such that the one or more actuating elements maintain a substantially fixed position relative to the user's shoulders.

According to a second aspect of the present disclosure, there is provided an adjustable support frame for a breathing apparatus, the support frame having a user-facing side for facing a user's back and an outer-facing side for facing away from a user's back, the support frame comprising: a first frame portion and a second support portion, the first and second frame portions being moveable relative to each other so as to adjust a dimension of the adjustable support; an adjustment mechanism having a locked configuration which prevents relative movement of the first and second frame portions and an unlocked configuration which permits relative movement of the first and second frame portions, the adjustment mechanism comprising one or more actuating elements which are operable to actuate the adjustment mechanism from the locked configuration to the unlocked configuration, wherein the one or more actuating elements are arranged to be accessible on the outer-facing side of the support frame.

According to a third aspect of the present disclosure, there is provided a breathing apparatus comprising an adjustable support frame according to the first aspect described above.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE INVENTION

Figure 1:
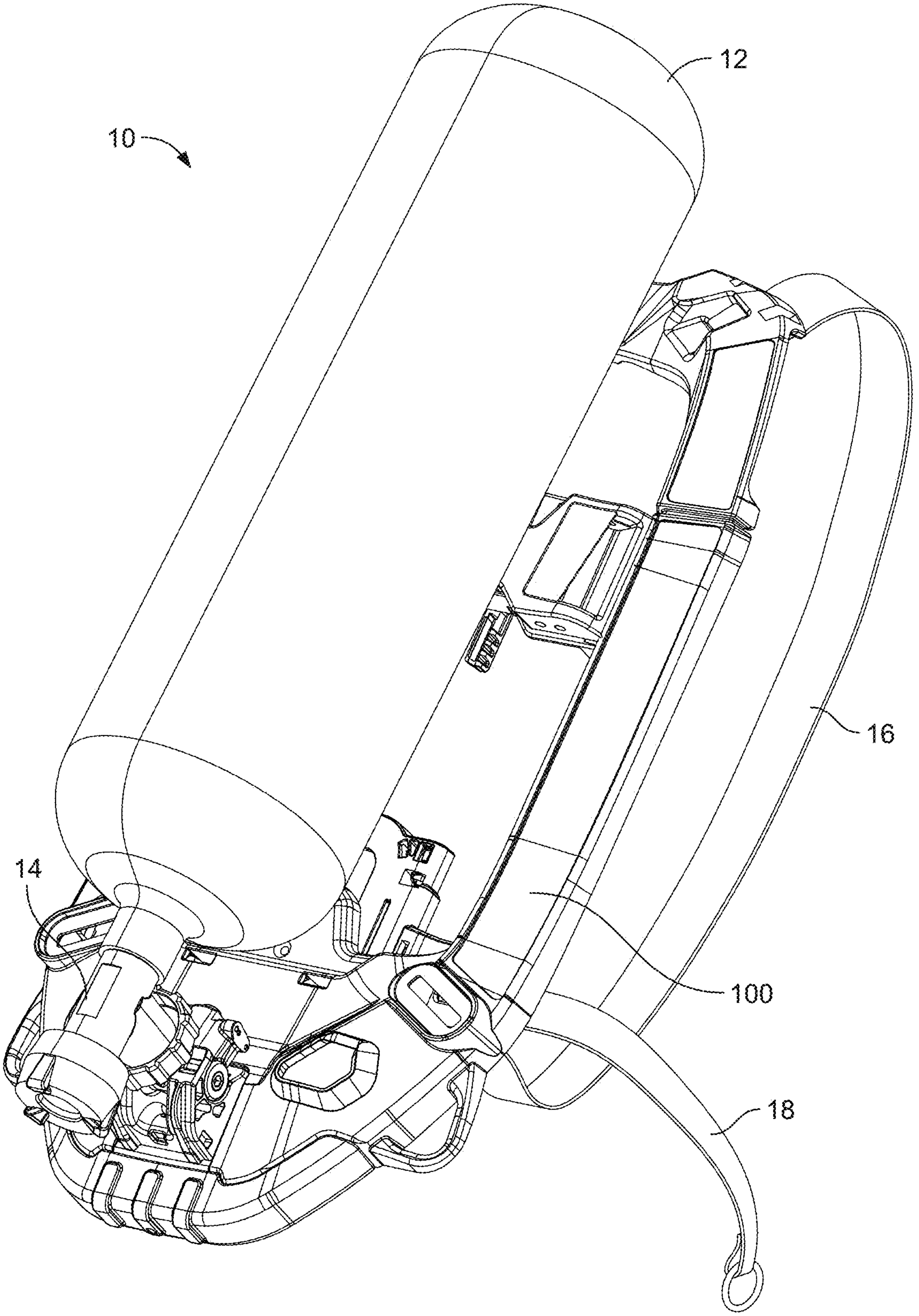
FIG. 1 is a perspective view of a breathing apparatus comprising an adjustable support frame.

Referring to FIG. 1, a breathing apparatus 10 is shown. In this example, the breathing apparatus 10 is a self-contained breathing apparatus (SCBA), although it should be understood that the principles of this disclosure could be applied to other types of breathing apparatus which have support frames.

The breathing apparatus 10 comprises an adjustable support frame 100, also known as a back plate, which supports a breathing gas cylinder 12. A valve apparatus 14 is provided for securing the cylinder 12 to the support frame 100 and transferring gas out of the cylinder 12 for a user to breath via hosing and a lung demand valve (not shown). It should be understood that the breathing apparatus is generally provided to provide its user with a supply of clean breathing air in environments where clean breathing air is not available in the ambient environment, such as in fires, chemical leaks, etc.

Figure 9:
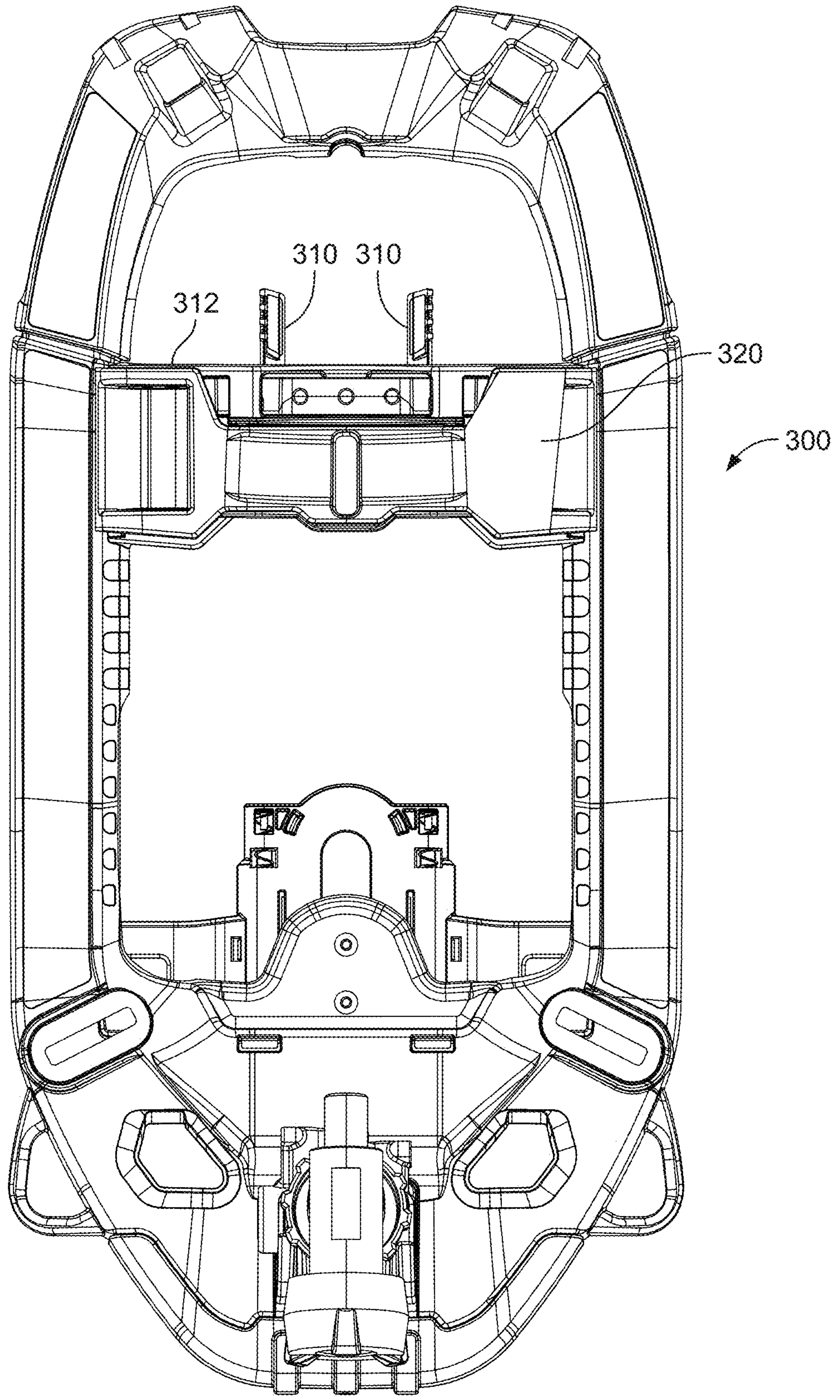
FIG. 9 shows a further alternative adjustable support frame having a further alternative arrangement of the actuating elements.

The breathing apparatus 10 is configured to be word by a user on the user's back (see FIG. 9, for example). To achieve this, the breathing apparatus 10 comprises shoulder straps 16, which are configured to be worn over a user's shoulders and encircling the user's arms, and a waist belt 18, which is secured around a user's waist.

Figure 2:
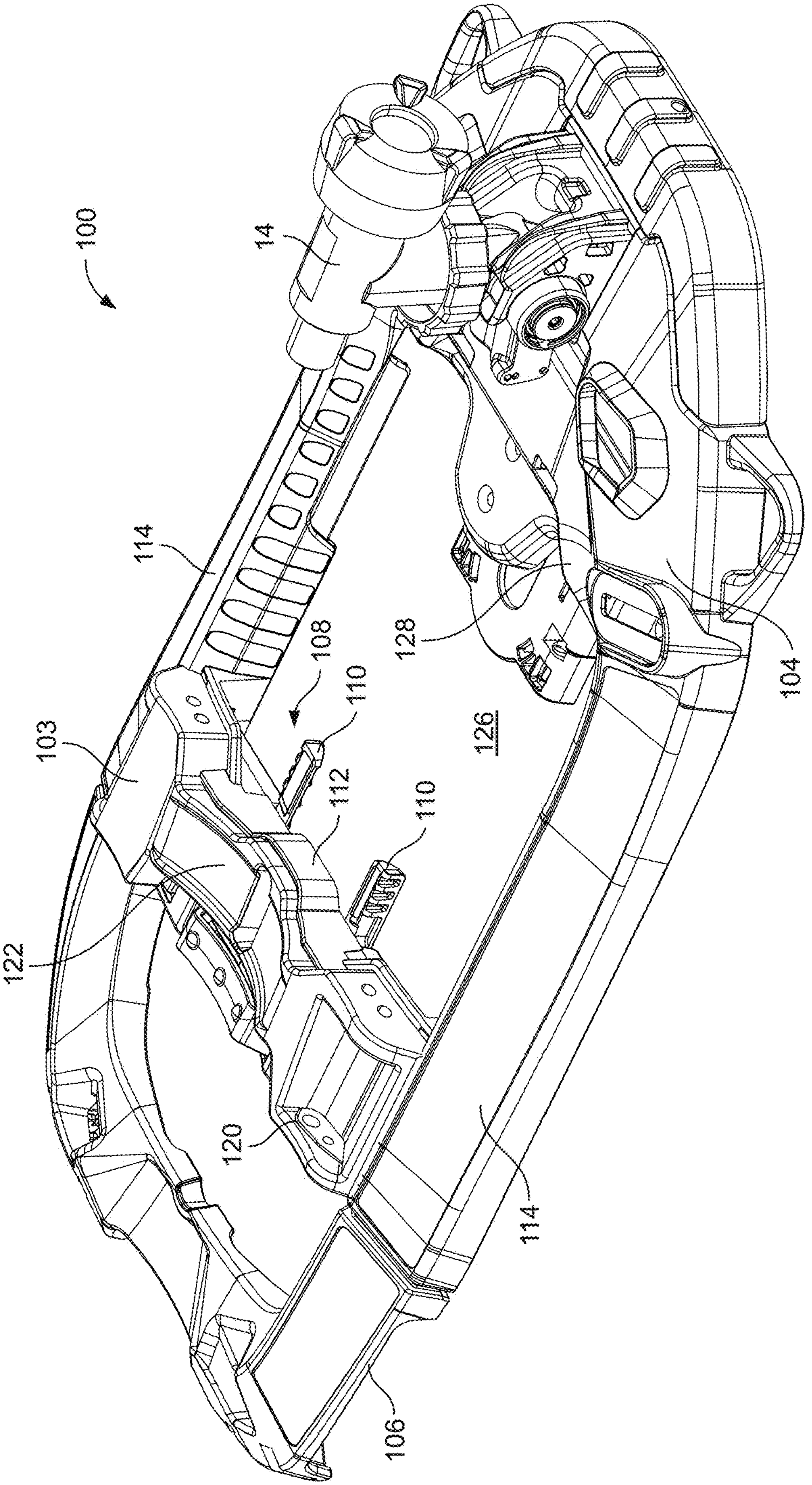
FIG. 2 is a perspective view of an adjustable support frame for a breathing apparatus as shown in FIG. 1.
Figure 3:
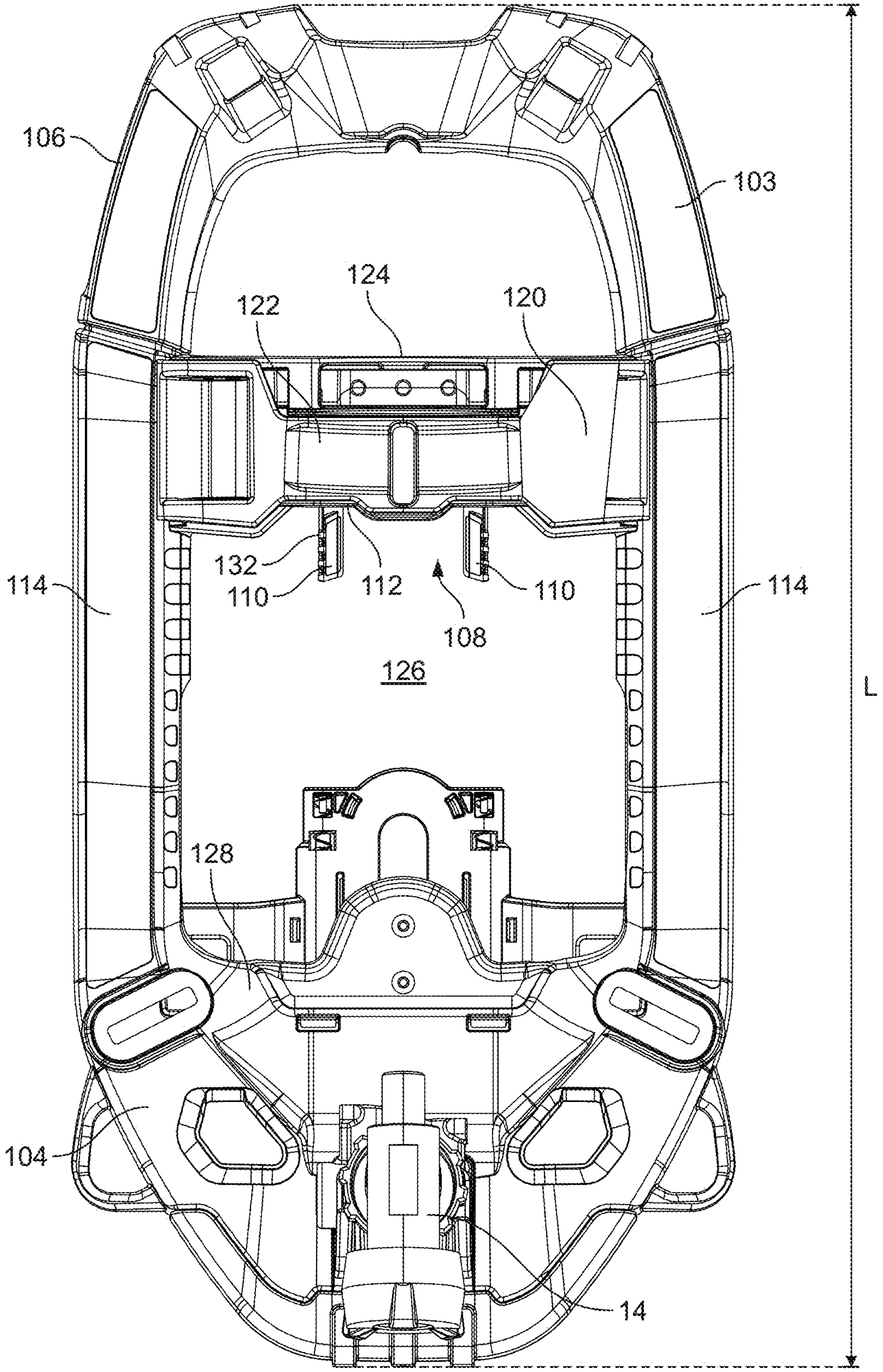
FIG. 3 is a plan view of an outer-facing side of the support frame of FIG. 2.
Figure 4:
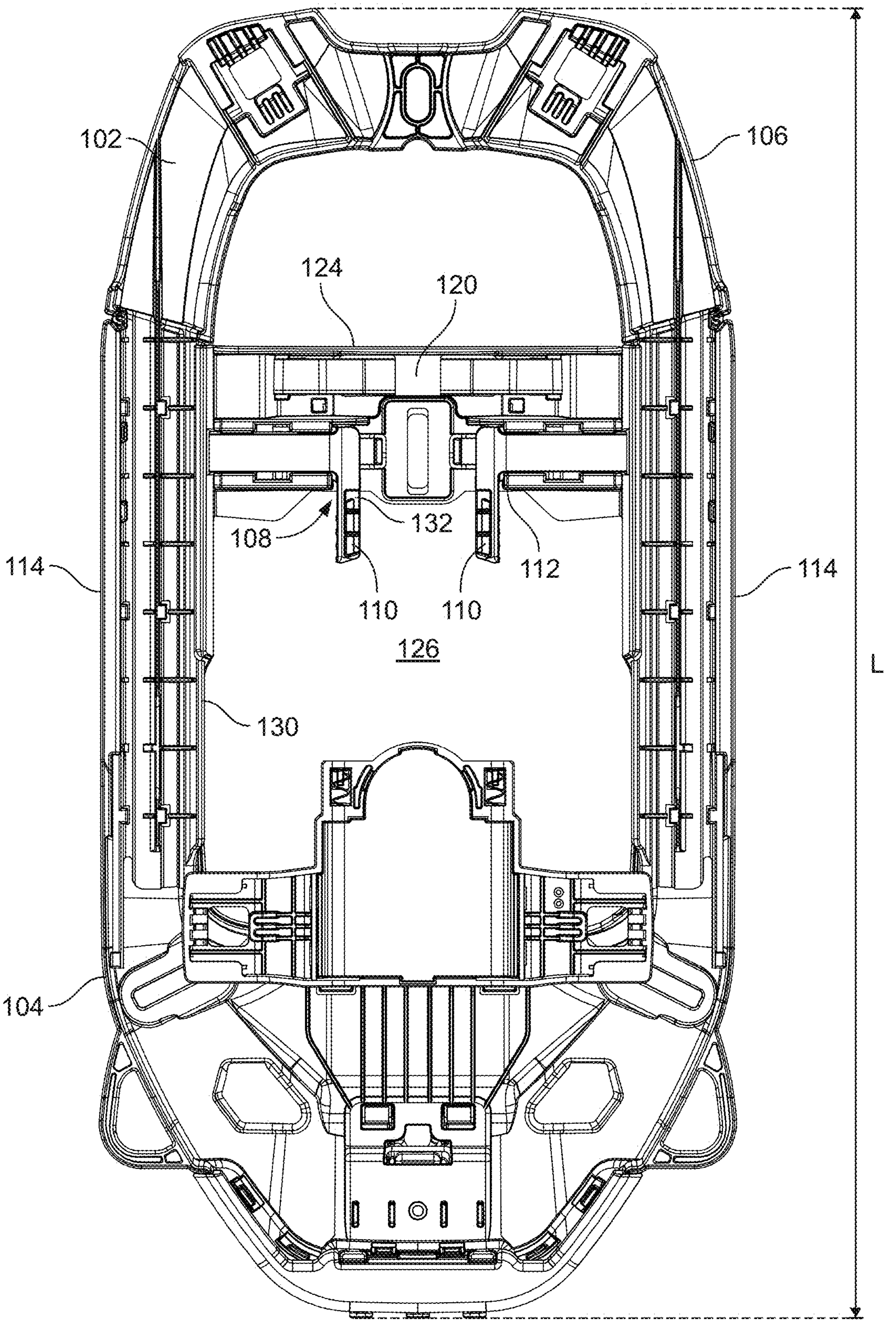
FIG. 4 is a plan view of a user-facing side of the support frame of FIG. 2.

Turning now to FIGS. 2, 3 and 4, the adjustable support frame 100 for the breathing apparatus 10 is shown in more detail. FIG. 2 shows the support frame 100 in a perspective view showing an outer-facing side 103 of the support frame 100. FIG. 3 shows a plan view of the support frame 100 from the outer-facing side 103. FIG. 4 shows a plan view of the same support frame 100 from a user-facing side 102.

The adjustable support frame 100, as shown in FIGS. 3 and 4 has an adjustable longitudinal dimension L, which will be referred to in this detailed description as a length L. It should be understood that the longitudinal direction is the direction of vertical extent of the support frame 100 in use. The term "longitudinal" may be understood as a direction which is substantially vertical in use of the support frame. The longitudinal direction may be parallel with the direction of extent of the user's spine or body when standing. The term "lateral" herein may be understood as a direction which is substantially horizontal in use of the support frame and which generally extends sideways relative to (i.e. across) the user. The lateral direction may generally be parallel to the direction of a line extending between the user's shoulders and/or hips.

The length L of the support frame 100 is the total length of the support frame 100 in the longitudinal direction. The length L is adjustable, which will be discussed in more detail with respect to FIGS. 5A and 5B below.

The support frame 100 is formed from a first, lower frame portion 104 and a second frame portion 106. The first and second frame portions 104, 106 are moveable relative to each other so as to adjust the length L of the support frame 100, as will be described in more detail with respect to FIGS. 5A and 5B below.

In order to adjust the length L of the support frame 100, the support frame 100 comprises an adjustment mechanism 108. The adjustment mechanism 108 is adjustable between a locked configuration which inhibits relative movement of the first and second frame portions 104,106 and an unlocked configuration which permits relative movement of the first and second frame portions 104,106. This will be described in more detail with respect to FIGS. 6A and 6B below.

As shown in FIGS. 2-4, the adjustment mechanism 108 comprises two actuating elements 110 which are operable to actuate the adjustment mechanism 108. The actuating elements 110 are provided on a surface 112 which is substantially perpendicular to the user-facing side 102 of the support frame 100. Generally, this should be understood to mean that the surface 112 faces sideways or vertically (or some combination thereof, for example diagonally upwards or downwards) with respect to the user-facing side 102. The provision of the actuating elements 110 on such a surface provides that the actuating elements 110 are not overlaid by a user's back in use, nor arranged out of reach of the user on the outer-facing side 103, such that the user can actuate the actuating elements themselves while wearing the support frame 100. It should be understood that the surface 112 need not be exactly perpendicular to the user-facing side 102 of the support frame 100. Rather, the surface 112 should be arranged sufficiently out-of-plane with the user-facing side 102 such that the actuating elements 110 thereon are accessible from a sideways or vertical direction (or some combination thereof), so that they are not overlaid by a user's back in use. For brevity in this detailed description, the surface on which the actuating element or elements are provided may be referred to as an accessible surface 112.

In this example, the accessible surface 112 is a longitudinally facing surface. The accessible surface 112 faces (i.e. is normal to) the longitudinal direction of the support frame 100. The accessible surface 112 faces downwardly in use.

The support frame 100, in this example, comprises first and second frame rails 114. The frame rails 114 are laterally spaced across the support frame 100. The frame rails 114 are telescopic in this example, with an outer frame rail 116 provided on the lower frame portion 104, which receives an inner frame rail 118 provided on the upper frame portion 106 (see FIG. 5B for more detail). Thus, the inner frame rails 118 can be withdrawn from the outer frame rails 116 to increase the length of the support frame 100. The frame rails 114 extend in a substantially longitudinal direction along the support frame 100.

The support frame 100 comprises a bridge portion 120 which extends in a lateral direction substantially perpendicular to the frame rails 114. In this example, the bridge portion 120 extends laterally between the two frame rails 114. Furthermore, in this example, the bridge portion comprises a cylinder cradle 122 for supporting the breathing gas cylinder 12 of the breathing apparatus 10 in use.

The actuating elements 110 are, in this example, provided on the accessible surface 112 which is a longitudinally-facing surface of the bridge portion 120. In particular, the actuating elements 110 are provide on the lower (in use) surface of the bridge portion 120. The bridge portion 120 has an opposing upper (in use) longitudinally facing surface 124, which faces upwards in use.

In this example, the support frame 100 comprises an aperture 126 through the support frame 100 between the user-facing side 102 and the outer-facing side 103. In this example, the aperture 126 is substantially rectangular, and is bounded by the frame rails 114 on its lateral sides, by the bridge portion 120 at its upper side, and by a base bridge portion 128 of the support frame 100 at its lower side. It should be understood that the aperture 126 is an open hole or window through the support frame 100.

The aperture 126 is bounded by a peripheral wall 130. The peripheral wall 130 is formed, in this example as a substantially rectangular peripheral wall comprising portions formed by the frame rails 114, by the bridge portion 120, and by a base bridge portion 128. Other shapes of aperture can be envisaged, for example a circular or oval aperture, having respective peripheral walls. In this example, the accessible surface 112 on which the actuating elements 110 are provided is a portion of the peripheral wall 130 of the aperture 126. It should be understood that, by providing the aperture 126 through the support frame 100, the one or more actuating elements are therefore accessible on the outer-facing side of the support frame 100. Therefore, they could be conveniently accessed by another person than the user who is stood behind the user. This may provide a more convenient and universally adjustable support frame.

In other examples, instead of an aperture which extends completely through the support frame 100, a relief (i.e. a relieved space) could be provided. The relief may be bounded, like the aperture 126 describe above, by a peripheral wall. However, the relief may not extend completely through the depth of the support frame so as to form an aperture.

In this example, the actuating elements 110 extend into the aperture 126 from the peripheral wall 130 and, in particular, the accessible surface 112 of the bridge portion 120. In other words, the actuating elements 110 project out or stand proud from the peripheral wall to extend into the aperture 126. This projection of the actuating elements 110 may enable them to be more easily grasped by a user. The actuating elements 110 of this example are formed with an elongate grippable portion 132 which extends longitudinally from the accessible surface 112, i.e. generally parallel to the user-facing side 102.

Figure 5A:
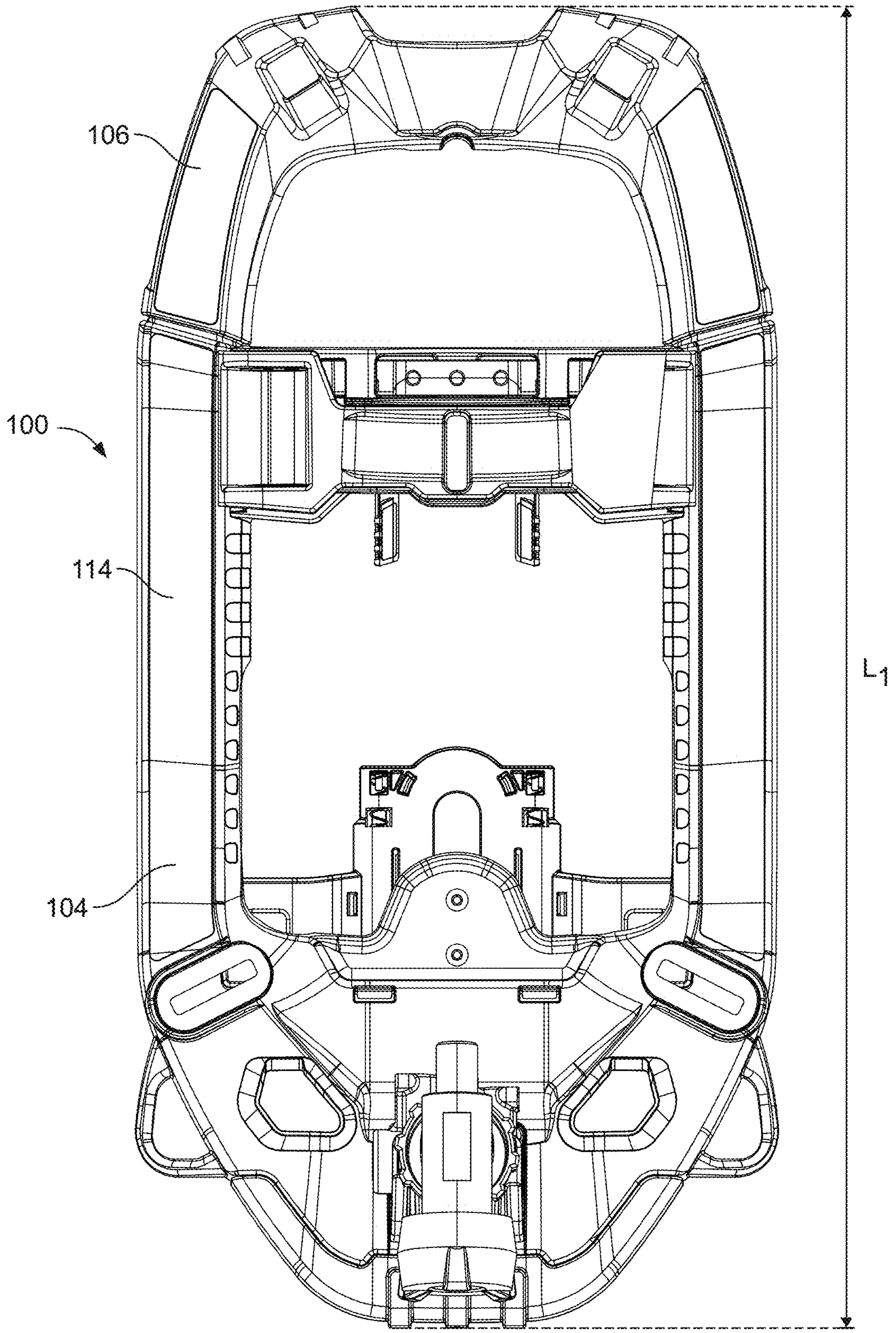
FIGS. 5A and 5B show the support frame of FIG. 2 in a first configuration having a first longitudinal dimension and a second configuration having a second longitudinal dimension respectively.
Figure 5B:
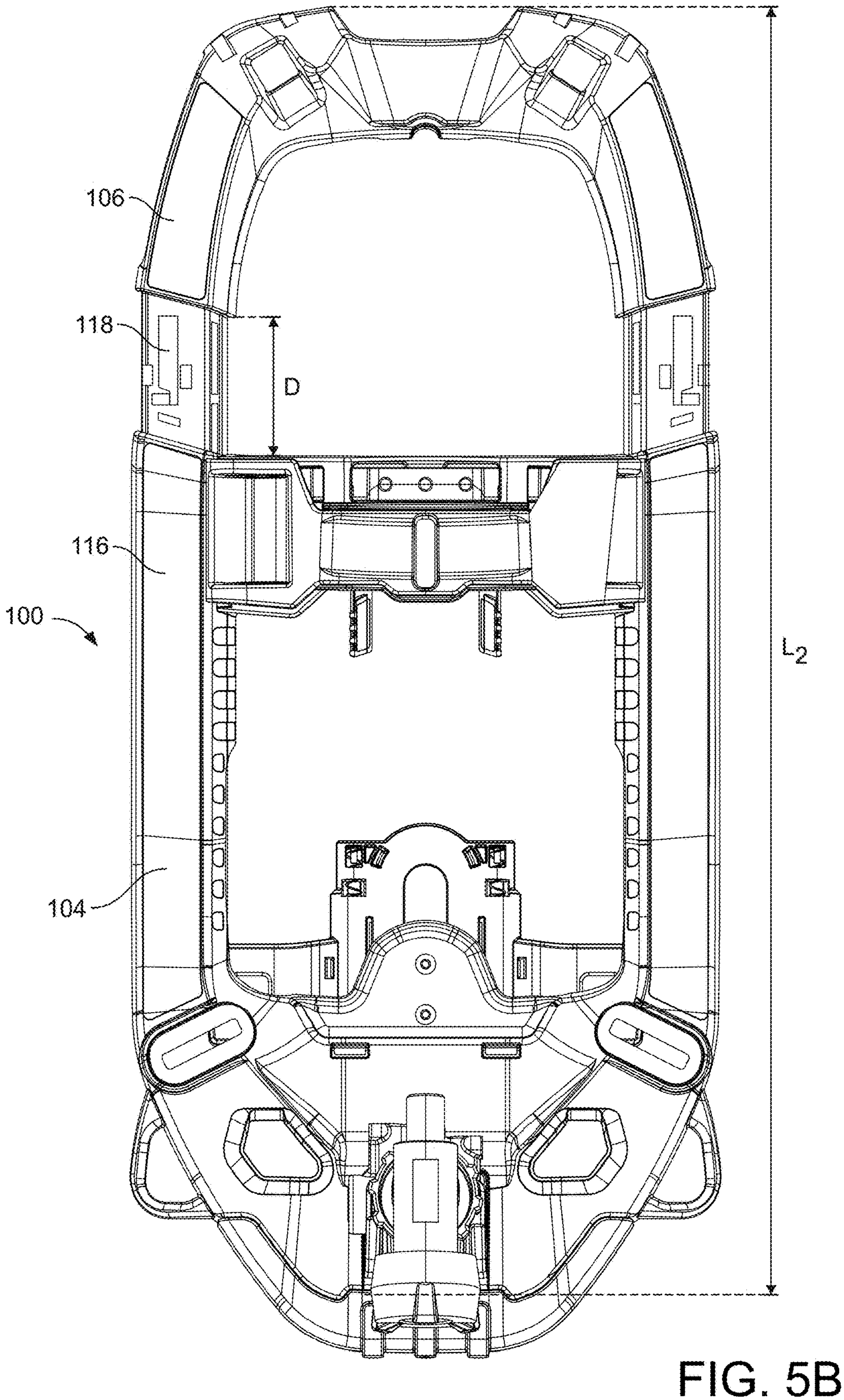

Referring now to FIGS. 5A and 5B, the adjustment of the length of the support frame 100 will be described briefly.

FIG. 5A shows the support frame 100 in a first configuration, which in this example is the shortest possible configuration, having a total length L1. In FIG. 5A, the inner frame rail 118 is completely received within the outer frame rail 116.

In FIG. 5B, the support frame 100 is shown in a second configuration, where the total length of the support frame 100 is an extended length L2. In this configuration, the inner frame rails 118 have been telescoped out of the outer frame rails 116 by a distance D, such that the total length of the support frame 100 is increased. The difference between length L1 and L2 is, as should be understood, the distance D. By adjusting the distance D by withdrawing and inserting different lengths of the inner frame rails 118 into the outer frame rails 116, the length L of the support frame can be adjusted to suit the size of the user.

Of course, it could be undesirable for the length L of the support frame to change accidentally, so the adjustment mechanism 108 prevents relative movement of the frame portions 104,106 (i.e. movement of the inner frame rails 118 relative to the outer frame rails 116) unless it is moved to its unlocked configuration.

The configuration of the adjustment mechanism 108 will now be described in more detail with respect to FIGS. 6A and 6B.

Figure 6B:
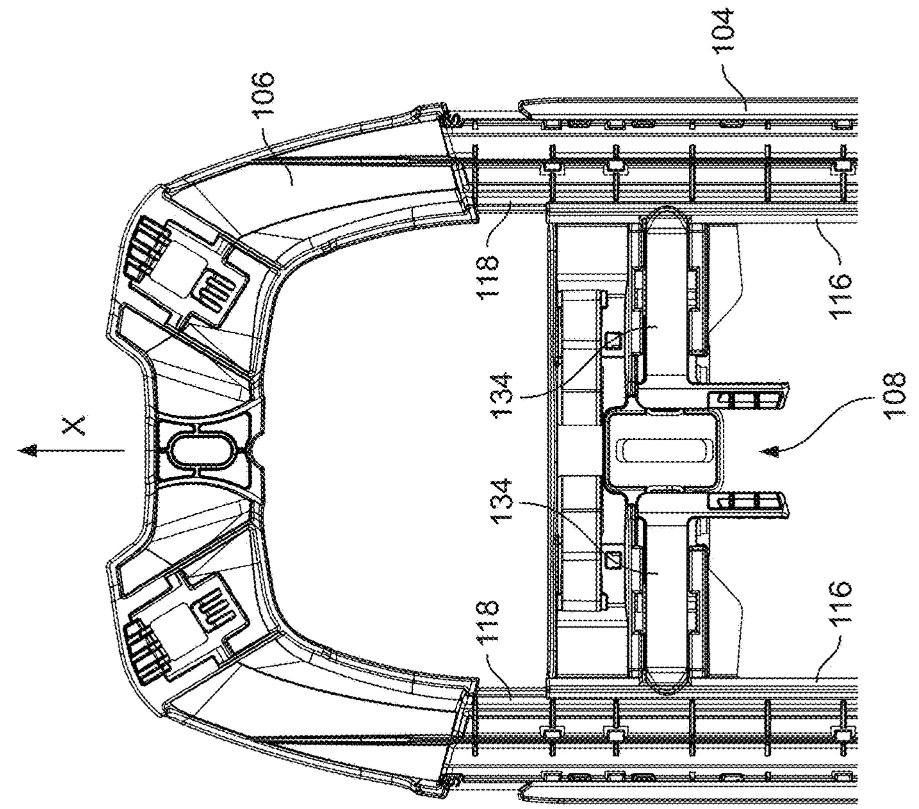
FIGS. 6A and 6B show the adjustment mechanism of the support frame of FIG. 2 in a locked configuration and an unlocked configuration respectively.
Figure 6A:
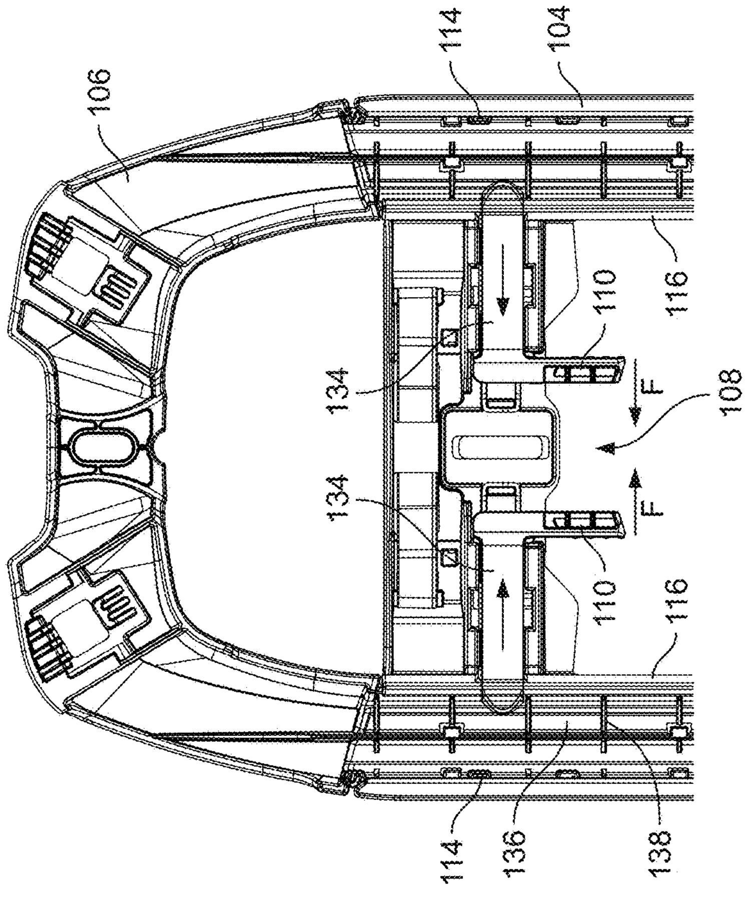

Each of FIGS. 6A and 6B shows a close-up view of the upper portion of the user-facing side 102 of the support frame 100.

In FIG. 6A, the adjustment mechanism 108 is shown in the locked configuration. It can be seen here that the adjustment mechanism 108 comprises a pair of opposing bolts 134, each of which extends laterally in an opposing direction into one of the frame rails 114. The bolts 134 extend through the outer frame rail 116 and into the inner frame rail 118.

The inner frame rail 118 comprises a plurality of longitudinally spaced pockets 136, which are separated by walls 138. The pockets 136 provide a plurality of discrete lengths for the support frame 100.

In this locked position, the bolts 134 extend into one of the pockets 136, such that the inner frame rail 118 is prevented from moving longitudinally relative to the outer frame rail 116 by contact between the bolts 134 and the walls 138. Therefore, in the locked position of the adjustment mechanism 108, the upper and lower frame portions 104,106 cannot be moved relative to one another, and the length L of the frame support is locked.

FIG. 6B shows the adjustment mechanism 108 in the unlocked position.

In order to move the adjustment mechanism 108 to the unlocked position, the user can grasp the actuating elements 110, which are conveniently accessible on the accessible surface 112 even when the support frame 100 is worn, and apply a force F to the actuating elements 110 (see FIG. 6A) to urge the actuating elements 110 towards one another, to the position shown in FIG. 6B.

Each of actuating elements 110 are attached to a respective one of the bolts 134. The bolts 134 are slidably moveable out of the inner frame rail 118, such that, when the actuating elements 110 are urged together, each of the bolts 134 are withdrawn from the respective inner frame rail 118 and, importantly, the pocket 136 in which they were located. In this position, the bolts 134 no longer prevent the longitudinal movement of the inner frame rail 118 relative to the outer frame rail 116, so the length of the support frame 100 can be freely adjusted as long as the actuating elements 110 are urged together.

Once the frame support has been adjusted to the desired length, the actuating elements 110 can be released. The bolts 134 are biased (by a spring, or similar) to return to the locked position so, on release of the actuating elements 110, the bolts 134 slide back into the inner frame rails 118, and the nearest pocket 136, and into the locked configuration of FIG. 6A.

It will be appreciated that the support frame 100 is configured such that the actuating elements 110 maintain a substantially static longitudinal position relative to a part of a user's back. In the example support frame 100, the lower frame portion 104 comprises the waist belt, for securing the lower frame portion at a fixed position on the user's waist or lower torso. The one or more actuating elements are also provided on the lower frame portion, such that they likewise maintain a substantially fixed position relative to the user's waist once the waist belt has been secured to the user's waist, even when the length L is adjusted.

In an alternative arrangement, the actuating elements may be provided on the upper frame portion 106, to which the upper ends of shoulder straps are attached. In this alternative example, once the shoulder straps have been donned by the user, the actuating elements will maintain a substantially fixed position relative to the user's shoulders, even when the length L is adjusted These arrangements may make the actuating elements 110 easier for a user to find and actuate while wearing the support frame 100, because they are in a reliable static position in use.

Providing actuating elements for the adjustment mechanism as described in this application provides significant advantages in terms of ease of adjustment of the length of the support frame while the breathing apparatus is in use. In prior art support frames, it has generally been a design aim to provide systems which prevent adjustment of the length of the support frame in use, so as to avoid accidental adjustments. However, such systems can prevent quick response to emergencies as, if the support frame is wrongly adjusted, then the breathing apparatus may need to be doffed entirely in order to adjust. In contrast, support frames according to the present disclosure are very convenient to adjust while the breathing apparatus is donned.

Figure 7:
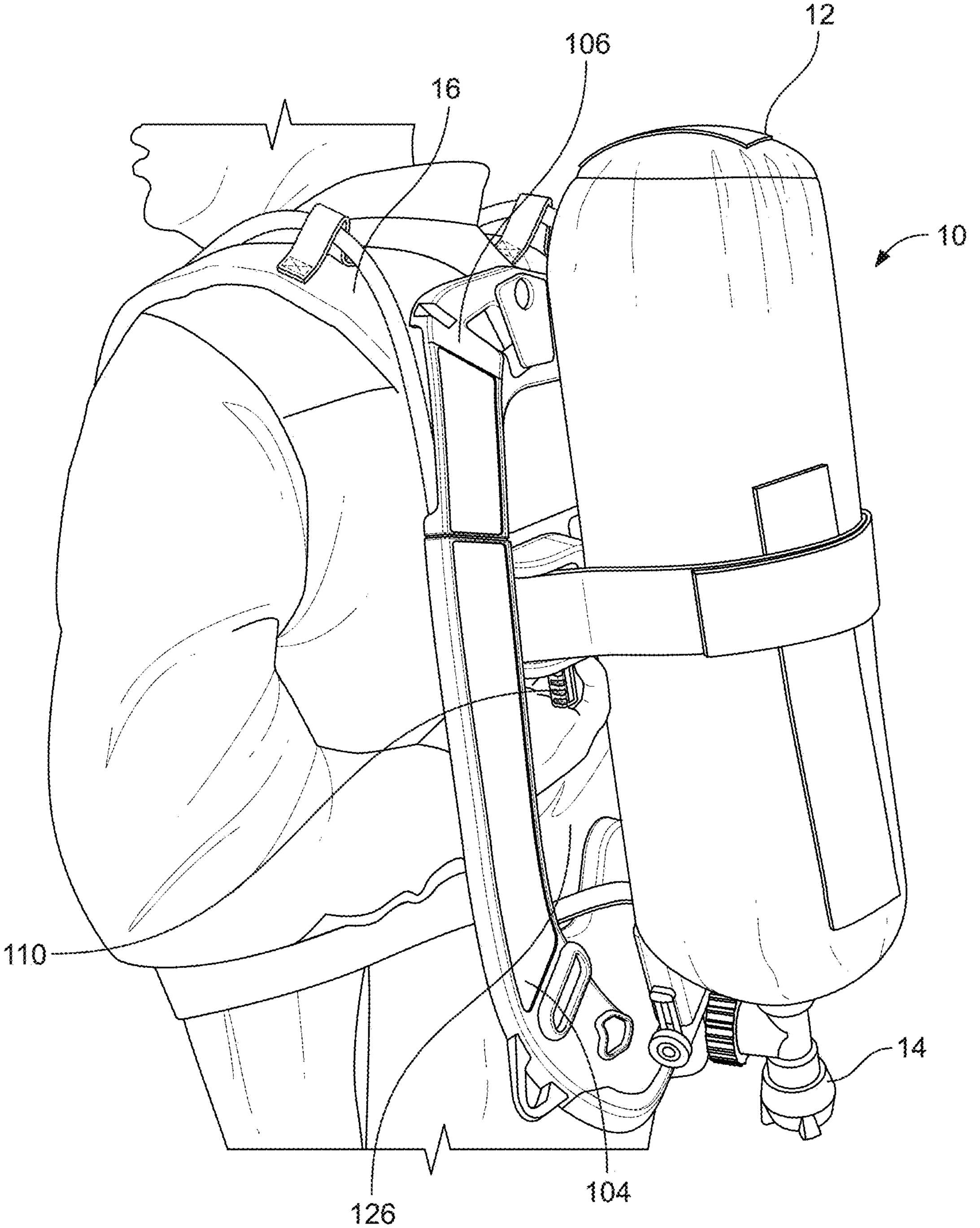
FIG. 7 shows the support frame of FIG. 2 in use by a user when the user is actuating the actuating elements.

FIG. 7 shows a user wearing a breathing apparatus 10 comprising a support frame 100 and actuating the actuating elements 110 provided on an accessible surface as described herein. As will be appreciated, due to the provision of the actuating elements on a substantially perpendicular surface to the user-facing side, the user themselves can reach around and actuate the actuating elements themselves with one hand. Furthermore, in the example shown in FIG. 7, an aperture 126 through the support frame 100 provides easy access to the actuating elements 110 for other personnel, without having to reach around the side of the frame 100 into the enclosed space between the user and the frame 100. Thus, a very convenient adjustment of the length of the support frame 100 can be made while it is being used.

Figure 8:
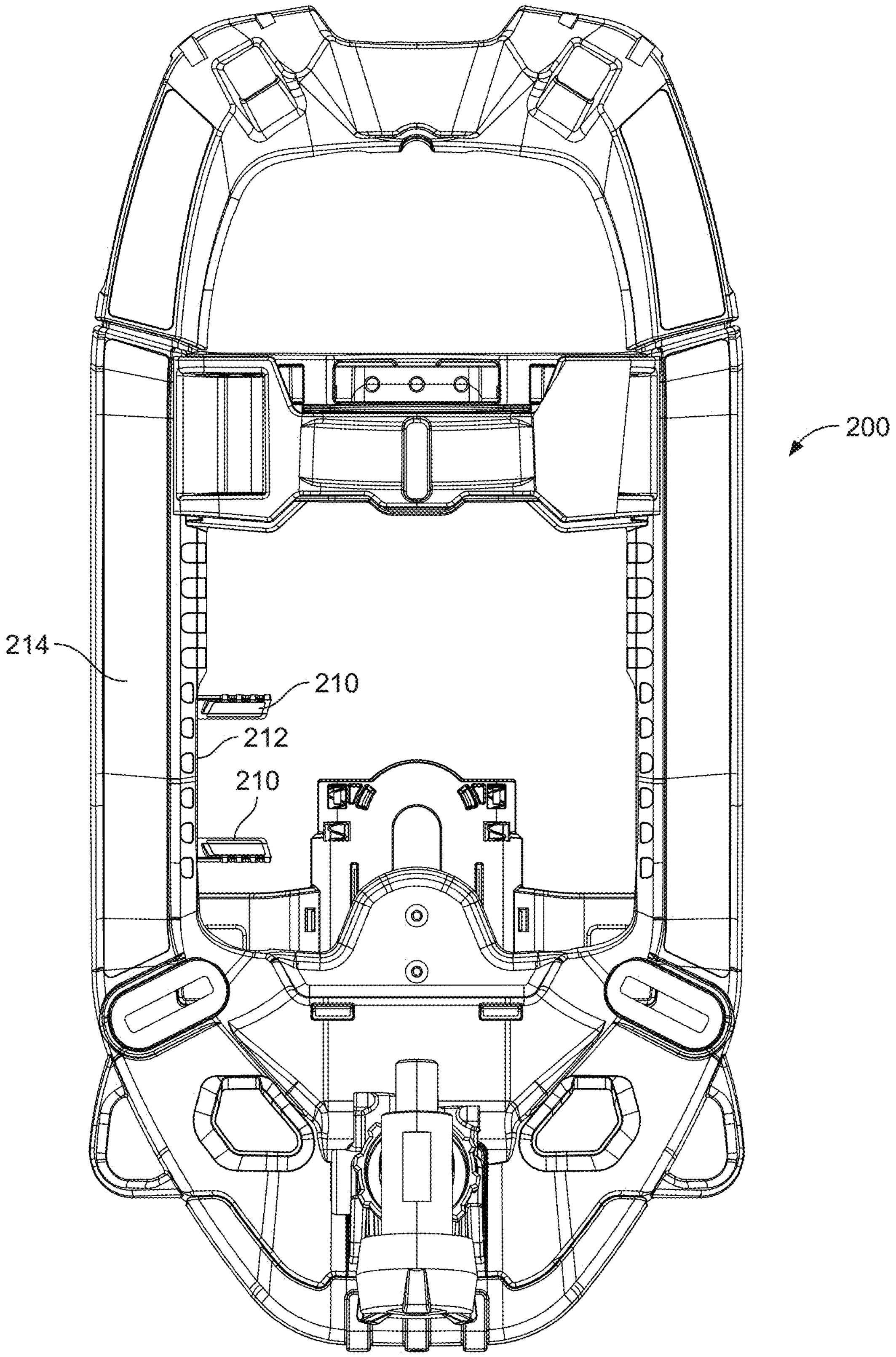
FIG. 8 shows an alternative adjustable support frame having an alternative arrangement of the actuating elements.

FIGS. 8 and 9 show alternative configurations of support frames incorporating the principles of the present disclosure.

FIG. 8 shows an alternative support frame 200 having actuating elements 210 provided on a laterally-facing accessible surface 212 which is provided on a lateral surface of one of the frame rails 214. In this example, the user could reach around into the small of their back to actuate the actuating elements 210.

FIG. 9 shows a yet further alternative support frame 300 having actuating elements 310 provided on the opposing upward-facing accessible surface 312 on the bridge portion 320. In this example, the user could reach over their head (in a similar manner to a tricep stretch) to access and actuate the actuating elements 310.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

It will be appreciated by a skilled person that although the invention has been described by way of example, with reference to exemplary examples, it is not limited to the disclosed examples and that alternative examples could be constructed without departing from the scope of the invention as defined by the appended claims.

For the avoidance of doubt, the disclosure extends to the subject matter recited in the following numbered Paras:

Para 1. An adjustable support frame (100, 200, 300) for a breathing apparatus (10) having an adjustable longitudinal dimension (L) and a user-facing side (102) configured to substantially overlay a user's back in use, the adjustable support frame (100, 200, 300) comprising:

- a first frame portion (104) and a second frame portion (106), the first and second frame portions (104, 106) being moveable relative to each other so as to adjust the longitudinal dimension (L);
- an adjustment mechanism (108) having a locked configuration which inhibits relative movement of the first and second frame portions (104, 106) and an unlocked configuration which permits relative movement of the first and second frame portions (104, 106);
- wherein the adjustment mechanism (108) comprises one or more actuating elements (110, 210, 310) which are operable to actuate the adjustment mechanism (108) from the locked configuration to the unlocked configuration, the one or more actuating elements (110, 210, 310) being provided on a surface (112, 212, 312) which is substantially perpendicular to the user-facing side (102) of the support frame (100, 200, 300).

Para 2. An adjustable support frame (100, 200, 300) for a breathing apparatus (10) according to Para 1, wherein the surface (112, 212, 312) is a substantially longitudinally-facing surface (112, 212) or a laterally-facing surface (312).

Para 3. An adjustable support frame (100, 200, 300) for a breathing apparatus (10) according to Para 1, wherein the adjustable support frame (100, 200, 300) comprises at least one frame rail (114) which extends in a substantially longitudinal direction.

Para 4. An adjustable support frame (100, 200, 300) for a breathing apparatus (10) according to Para 3, further comprising a bridge portion (120, 320) extending in a lateral direction substantially perpendicular to the at least one frame rail (114, 314).

Para 5. An adjustable support frame (100, 200, 300) for a breathing apparatus (10) according to Para 4, comprising first and second laterally-spaced frame rails (114), wherein the bridge portion (120, 320) extends laterally between the frame rails (114).

Para 6. An adjustable support frame (100, 300) according to Para 4, wherein the one or more actuating elements (110, 310) are provided on a longitudinally-facing surface (112, 312) of the bridge portion (120, 320).

Para 7. An adjustable support frame (100, 200, 300) for a breathing apparatus (10) according to Para 1, wherein the support frame (100, 200, 300) comprises:

the user-facing side (102) and an outer-facing side (103) opposing the user facing side;

a relief formed in the user-facing side (102) of the support frame (100, 200, 300), or an aperture (126) through the support frame (100, 200, 300) between the user-facing side (102) and the outer-facing side (103); and wherein the one or more actuating elements (110, 210, 310) are arranged on a peripheral wall (130) of the relief or aperture (126).

Para 8. An adjustable support frame (100, 200, 300) according to Para 7, wherein the support frame (100, 200, 300) comprises two frame rails (114, 214) which define the relief or aperture (126) therebetween, and wherein the frame rails (114, 214) comprise at least a portion of the peripheral wall (130) of the relief or aperture (126).

Para 9. An adjustable support frame (100, 200, 300) according to Para 7, wherein a bridge portion (120, 320) defines at least a portion of the peripheral wall (130).

Para 10. An adjustable support frame (100, 200, 300) according to Para 7, wherein the one or more actuating elements (110, 210, 310) extend into the relief or aperture (126) from a peripheral wall (130).

Para 11. An adjustable support frame (100, 200, 300) according to Para 1, wherein the one or more actuating elements (110, 210, 310) comprise an elongate grippable portion (132) which extends in a direction substantially parallel to the user-facing side (102) of the support frame (100, 200, 300), optionally substantially longitudinally or laterally relative to the support frame (100, 200, 300).

Para 12. An adjustable support frame (100, 200, 300) according to Para 7, wherein the adjustment mechanism (108) comprises first and second actuating elements (110, 210, 310) which, when urged together by a user, actuate the adjustment mechanism (108) into the unlocked position.

Para 13. An adjustable support frame (100, 200, 300) according to Para 1, the first and/or second frame portions (104, 106) are configured such that the one or more actuating elements (110, 210, 310) maintain a substantially static longitudinal position relative to a part of a user's back.

Para 14. An adjustable support frame (100, 200, 300) according to Para 1, wherein:

the first frame portion is an upper frame portion (106), and the second frame portion is a lower frame portion (104);

the upper frame portion (106) comprises fixing points for an upper end of one or more shoulder straps (16) for supporting the support frame (100, 200, 300) on a user's shoulders and the lower frame portion (104) comprises a securement apparatus, optionally a waist belt (18), for securing the lower frame portion (104) at a user's waist or lower torso, and wherein the one or more actuating elements (110, 210, 310) are provided:

on the lower frame portion (104), such that the one or more actuating elements (110, 210, 310) maintain a substantially static position relative to the user's waist; or on the upper frame portion (106) such that the one or more actuating elements (110, 210, 310) maintain a substantially fixed position relative to the user's shoulders.

Para 15. A breathing apparatus (10) comprising an adjustable support frame (100, 200, 300) according to Para 1.

The invention claimed is:

1. An adjustable support frame for a breathing apparatus having an adjustable longitudinal dimension and a user-facing side configured to substantially overlay a user's back in use, the adjustable support frame comprising:

a first frame portion and a second frame portion, the first and second frame portions being moveable relative to each other so as to adjust the longitudinal dimension;

an adjustment mechanism having a locked configuration which inhibits relative movement of the first and second frame portions and an unlocked configuration which permits relative movement of the first and second frame portions;

wherein the adjustment mechanism comprises one or more actuating elements which are operable to actuate the adjustment mechanism from the locked configuration to the unlocked configuration, the one or more actuating elements being provided on a surface which is substantially perpendicular to the user-facing side of the support frame, wherein the adjustable support frame comprises at least one frame rail which extends in a substantially longitudinal direction and a bridge portion extending in a lateral direction substantially perpendicular to the at least one frame rail, and wherein the one or more actuating elements are provided on a longitudinally-facing surface of the bridge portion.

2. An adjustable support frame for a breathing apparatus as claimed in claim 1, comprising first and second laterally-spaced frame rails, wherein the bridge portion extends laterally between the frame rails.

3. An adjustable support frame for a breathing apparatus as claimed in claim 1, wherein the support frame comprises:

the user-facing side and an outer-facing side opposing the user facing side;

a relief formed in the user-facing side of the support frame, or an aperture through the support frame between the user-facing side and the outer-facing side; and wherein the one or more actuating elements are arranged on a peripheral wall of the relief or aperture.

4. An adjustable support frame as claimed in claim 3, wherein the support frame comprises two frame rails which define the relief or aperture therebetween, and wherein the frame rails comprise at least a portion of the peripheral wall of the relief or aperture.

5. An adjustable support frame as claimed in claim 3, wherein the bridge portion defines at least a portion of the peripheral wall.

6. An adjustable support frame as claimed in claim 3, wherein the one or more actuating elements extend into the relief or aperture from the peripheral wall.

7. An adjustable support frame as claimed in claim 1, wherein the one or more actuating elements comprise an elongate grippable portion which extends in a direction substantially parallel to the user-facing side of the support frame.

8. The adjustable support frame as claimed in claim 7, wherein the elongated grippable portion extends in a direction substantially longitudinally to the user-facing side of the support frame.

9. The adjustable support frame as claimed in claim 7, wherein the elongated grippable portion extends in a direction substantially laterally to the user-facing side of the support frame.

10. An adjustable support frame as claimed in claim 1, wherein the adjustment mechanism comprises first and second actuating elements which, when urged together by a user, actuate the adjustment mechanism into the unlocked configuration.

11. An adjustable support frame as claimed in claim 1, the first and/or second frame portions are configured such that the one or more actuating elements maintain a substantially static longitudinal position relative to a part of a user's back.

12. An adjustable support frame as claimed in claim 1, wherein:

the first frame portion is an upper frame portion, and the second frame portion is a lower frame portion;

the upper frame portion comprises fixing points for an upper end of one or more shoulder straps for supporting the support frame on a user's shoulders and the lower frame portion comprises a securement apparatus for securing the lower frame portion at a user's waist or lower torso, and wherein the one or more actuating elements are provided:

on the lower frame portion, such that the one or more actuating elements maintain a substantially static position relative to the user's waist; or on the upper frame portion such that the one or more actuating elements maintain a substantially fixed position relative to the user's shoulders.

13. The adjustable support frame as claimed in claim 12, wherein the securement apparatus comprises a waist belt.

14. A breathing apparatus comprising an adjustable support frame as claimed in claim 1.

* * * * *